US011203308B2

(12) United States Patent
Yamamoto et al.

(10) Patent No.: US 11,203,308 B2
(45) Date of Patent: Dec. 21, 2021

(54) WIRE HARNESS ROUTING DEVICE AND SLIDE WIRING DEVICE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Satoshi Yamamoto, Mie (JP); Kazuyoshi Ohara, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 25 days.

(21) Appl. No.: 16/636,663

(22) PCT Filed: Jul. 26, 2018

(86) PCT No.: PCT/JP2018/028024
§ 371 (c)(1),
(2) Date: Feb. 5, 2020

(87) PCT Pub. No.: WO2019/031254
PCT Pub. Date: Feb. 14, 2019

(65) Prior Publication Data

US 2021/0146864 A1 May 20, 2021

(30) Foreign Application Priority Data

Aug. 7, 2017 (JP) ................................ 2017-152205

(51) Int. Cl.

| | |
|---|---|
| ***B60R 16/02*** | (2006.01) |
| ***H02G 3/04*** | (2006.01) |
| ***H02G 11/00*** | (2006.01) |

(52) U.S. Cl.
CPC ....... *B60R 16/0215* (2013.01); *H02G 3/0475* (2013.01); *H02G 11/006* (2013.01)

(58) Field of Classification Search
CPC ..... B60R 16/0215; B60R 16/02; B60R 16/03; B60R 16/037; H02G 3/0475; H02G 11/006; H02G 3/04; B60N 2/07
(Continued)

(56) References Cited

U.S. PATENT DOCUMENTS

| | | | | |
|---|---|---|---|---|
| 6,997,499 B2 * | 2/2006 | Tsubaki | ............... | B60N 2/0224 174/72 A |
| 7,238,029 B2 * | 7/2007 | Tsubaki | ............. | B60R 16/0215 174/72 A |

(Continued)

FOREIGN PATENT DOCUMENTS

| | | |
|---|---|---|
| JP | 2012-045994 A | 3/2012 |
| JP | 2012-191830 A | 10/2012 |
| JP | 2017-022806 A | 1/2017 |

OTHER PUBLICATIONS

International Search Report dated Oct. 2, 2018 for WO 2019/031254 A1.

*Primary Examiner* — Timothy J Thompson
*Assistant Examiner* — Michael F McAllister
(74) *Attorney, Agent, or Firm* — Abelman, Frayne & Schwab

(57) ABSTRACT

A wire harness routing device 11 includes a wire harness 15, a case 16 in which the wire harness 15 is accommodated and which has an opening 30 through which the wire harness 15 can be led out of or into the case, a protector 21 attached to the wire harness 15 that is led out through the opening 30, and an engagement means 22 configured to disengageably engage the case 16 and the protector 21 with each other.

10 Claims, 19 Drawing Sheets

(58) Field of Classification Search
USPC ........................................................ 174/72 A
See application file for complete search history.

(56) References Cited

U.S. PATENT DOCUMENTS

| | | | | |
|---|---|---|---|---|
| 7,730,669 | B2 * | 6/2010 | Kida | B60R 16/0215 49/360 |
| 9,308,833 | B2 * | 4/2016 | Sekino | B60R 16/027 |
| 2004/0159764 | A1 * | 8/2004 | Oshima | B60N 2/067 248/429 |
| 2005/0035622 | A1 * | 2/2005 | Tsubaki | B60N 2/0732 296/65.13 |
| 2019/0054868 | A1 | 2/2019 | Yamamoto et al. | |

* cited by examiner 17
21
50
54
53
39
29
28
38
36
12
37
40
41
13
42
23
16
26
27
Z
X 10
11
12
13
41
42
16
17
21
26
27
50
53
Z
Y
X

WIRE HARNESS ROUTING DEVICE AND SLIDE WIRING DEVICE

CROSS REFERENCE TO RELATED APPLICATIONS

This application is a national phase of PCT application No. PCT/JP2018/028024, filed on 26 July 2018, which claims priority from Japanese patent application No. 2017-152205, filed on 7 Aug. 2017, all of which are incorporated herein by reference.

TECHNICAL FIELD

The technology disclosed in the present specification relates to a wire harness routing device and a slide wiring device using the same.

BACKGROUND

A wire harness routing device disclosed in Patent Document 1 is conventionally known as a wire harness routing device for electrically connecting a vehicle and a sliding component, such as a sliding seat, installed in the vehicle to each other. This wire harness routing device includes a rail, a slider that is slidably attached to the rail, a wire harness that is arranged in the rail with one end side of the wire harness connected to the slider, and a wire harness accommodating portion that accommodates the wire harness led out of the rail.

PRIOR ART DOCUMENT

Patent Document

Patent Document 1: JP 2012-45994A

SUMMARY OF THE INVENTION

Problems to be Solved

The above-described wire harness routing device is configured such that the rail to which the slider is attached and the wire harness accommodating portion in which the wire harness is accommodated are separately produced at different locations, and then the rail and the wire harness accommodating portion are assembled at a location where the assembly of these members is performed. Examples of the locations where the above-described members are produced or assembled include different locations within a single plant, a plurality of different plants, a plurality of different manufacturers, and the like.

In a state before the rail and the wire harness accommodating portion are assembled, the wire harness is led out of the wire harness accommodating portion. A protector member and a connector are attached to the wire harness that is led out of the wire harness accommodating portion. For this reason, there is concern that, during transport of the wire harness accommodating portion to the location where the assembly is performed, the wire harness that is led out of the wire harness accommodating portion, the protector member, and the connector may be damaged by being shaken due to vibrations that occur during transport and thus coming into contact with foreign objects.

The technology disclosed in the present specification was accomplished based on circumstances such as those described above, and it is an object thereof to provide a wire harness routing device with which contact with a foreign object is suppressed during transport.

Means to Solve the Problem

The technology disclosed in the present specification is a wire harness routing device including a wire harness, a case in which the wire harness is accommodated and which has an opening through which the wire harness can be led out of or into the case, a protector attached to the wire harness that is led out through the opening, and an engagement means configured to disengageably engage the case and the protector with each other.

With this configuration, the wire harness that is led out through the opening of the case can be engaged with the case. Thus, during transport of the wire harness routing device, the wire harness that is led out through the opening of the case is prevented from being shaken even when subjected to vibrations or the like. Therefore, the wire harness can be suppressed from colliding with a foreign object.

As embodiments of the technology disclosed in the present specification, the following embodiments are preferred.

The engagement means is constituted by an engaging portion provided in the case and an engaged portion provided in the protector.

With this configuration, compared with a case where the engagement means is constituted by a member that is different from the case and the protector, the number of components can be reduced.

It is preferable that the engaging portion is provided at an opening edge portion of the opening.

With this configuration, as the wire harness drawn out of the wire harness accommodating portion is pushed into the wire harness accommodating portion through the opening, the protector approaches the opening of the case. Since the engaging portion that is to be engaged with the engaged portion of the protector is provided at the opening edge portion of this opening, the operation for pushing the wire harness into the wire harness accommodating portion and the operation for moving the protector closer to the engaging portion formed at the opening edge portion of the opening can be performed at the same time. Therefore, the protector and the case can be easily positioned relative to each other.

It is preferable that a direction in which engagement between the case and the protector by the engagement means is cancelled is parallel to a direction in which the wire harness is led out through the opening.

With this configuration, the engagement between the case and the protector can be cancelled by pulling the wire harness in the direction in which the wire harness is led out through the opening. Thus, the engagement between the case and the protector can be cancelled using a simple method of pulling the wire harness.

The technology disclosed in the present specification is a slide wiring device including the wire harness routing device, a rail that extends in a direction in which the wire harness is led out through the opening, one end portion of the rail being disposed at the opening of the case, and a slider that is disposed in such a manner to be able to slide relative to the rail and that is fixed to the protector.

With this configuration, the wire harness routing device can be applied to the slide wiring device.

Moreover, the protector fixed to the slider can also be moved by sliding the slider. As a result, the wire harness can be pulled via the protector fixed to the slider by moving the slider in the direction in which the wire harness is led out through the opening. Thus, the engagement between the case and the protector can be cancelled. In this manner, the engagement between the case and the protector can be cancelled using a simple method of sliding the slider.

It is preferable that, in a state in which the protector and the case are engaged with each other, at least a portion of the protector is located in a region where the slider can slide, and one of the protector and the slider has a temporary locking portion that is to be temporarily locked to the other.

If the operation for assembling the slider and the protector is performed in a state in which the slider is disposed in the rail, the assembling operation may need to be performed in a region within the rail. In this case, the operation is performed in a tight space within the rail, and therefore, the operation efficiency decreases. To avoid this situation, a method is conceivable in which, after the slider is temporarily removed from the rail, the operation for assembling the slider and the protector is performed, and then the slider is attached to the rail again, but this procedure is troublesome.

With the above-described configuration, the protector and the slider can be temporarily locked to each other by sliding the slider in a state in which the protector is engaged with the case. Thus, the protector and the slider can be fixed to each other in a state in which the protector and the slider are temporarily locked to each other, and therefore, the efficiency of the operation for fixing the protector and the slider to each other can be improved.

Effect of the Invention

According to the technology disclosed in the present specification, the wire harness that is led out of the wire harness routing device is suppressed from coming into contact with foreign objects.

DETAILED DESCRIPTION TO EXECUTE THE INVENTION

Embodiment 1

Figure 1:
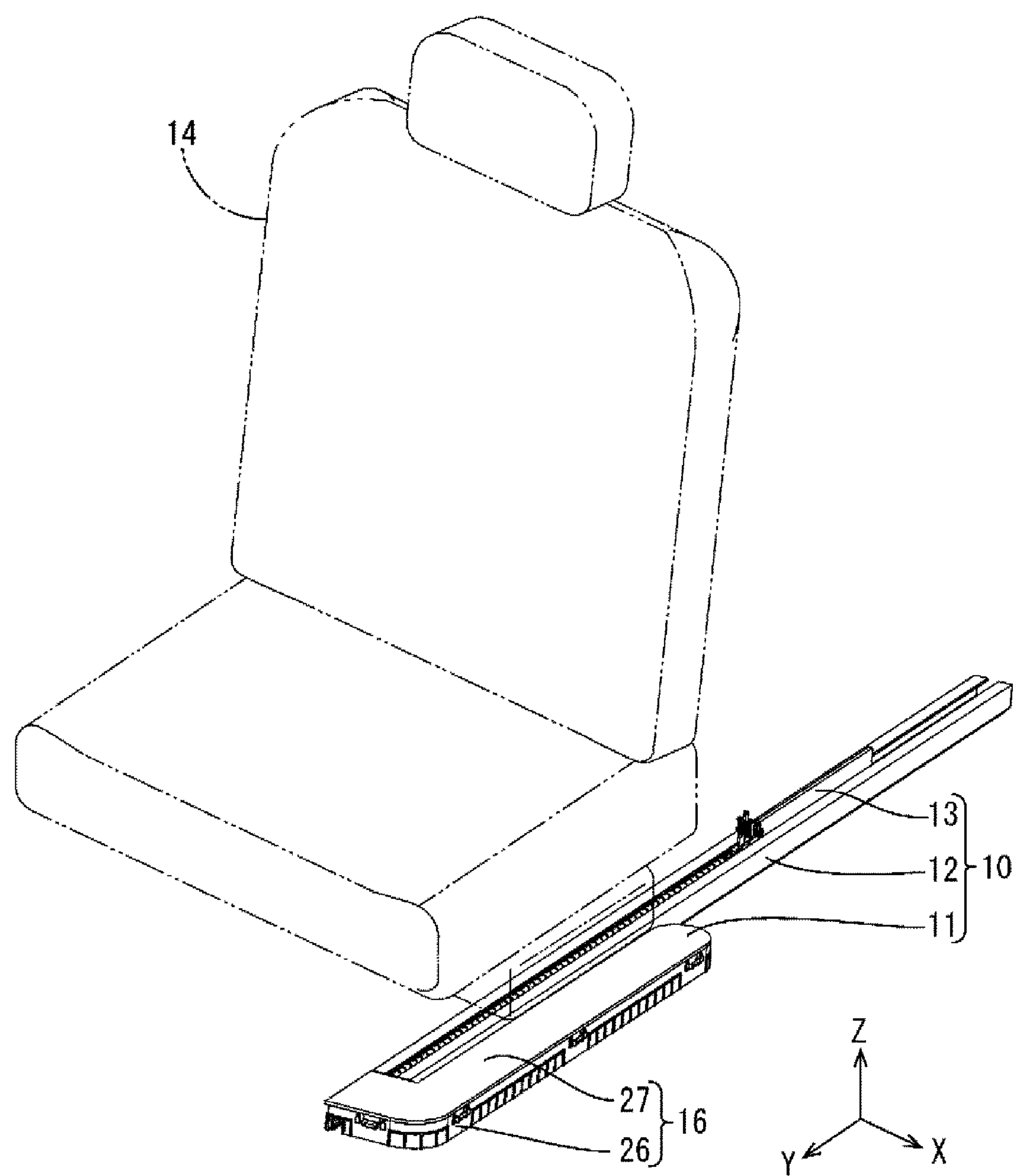
FIG. 1 is a perspective view showing a slide wiring device according to Embodiment 1.

Embodiment 1 of the technology disclosed in the present specification will be described with reference to FIGS. 1 to 19. A slide wiring device 10 according to the present embodiment includes a wire harness routing device 11, a rail 12, and a slider 13. The slide wiring device 10 of the present embodiment is used to route a wire harness 15 between a vehicle body (not shown) of a vehicle (not shown), such as an automobile, and a seat 14. In the following description, a direction X in FIG. 1 is taken as the right side, a direction Y as the front side, and a direction Z as the upper side. Also, there are cases where only one of a plurality of identical members is denoted by a reference numeral, while the reference numeral is omitted with respect to the other members.

As shown in FIG. 1, the seat 14 is slidable in the front-rear direction relative to the rail 12, which is made of a metal and is fixed on the floor inside the vehicle body by, for example, being bolted thereto. The seat 14 is provided with various electrical and electronic components such as, for example, an electric reclining device, a seat heater, a sensor for detecting whether or not an occupant is seated, and a sensor for detecting whether or not a seat belt is fastened. Although not shown in detail, the seat 14 is attached to the slider 13 that is slidably disposed in the rail 12.

(Wire Harness 15)

The wire harness 15 is routed on the floor (under a mat, a panel, or the like), or under the floor, of the vehicle body, and is connected to a device such as an ECU (electronic control unit) on the vehicle body side. The device on the vehicle body side supplies power to and sends and receives signals to and from the electrical and electronic components of the seat 14 via the wire harness 15.

Figure 2:
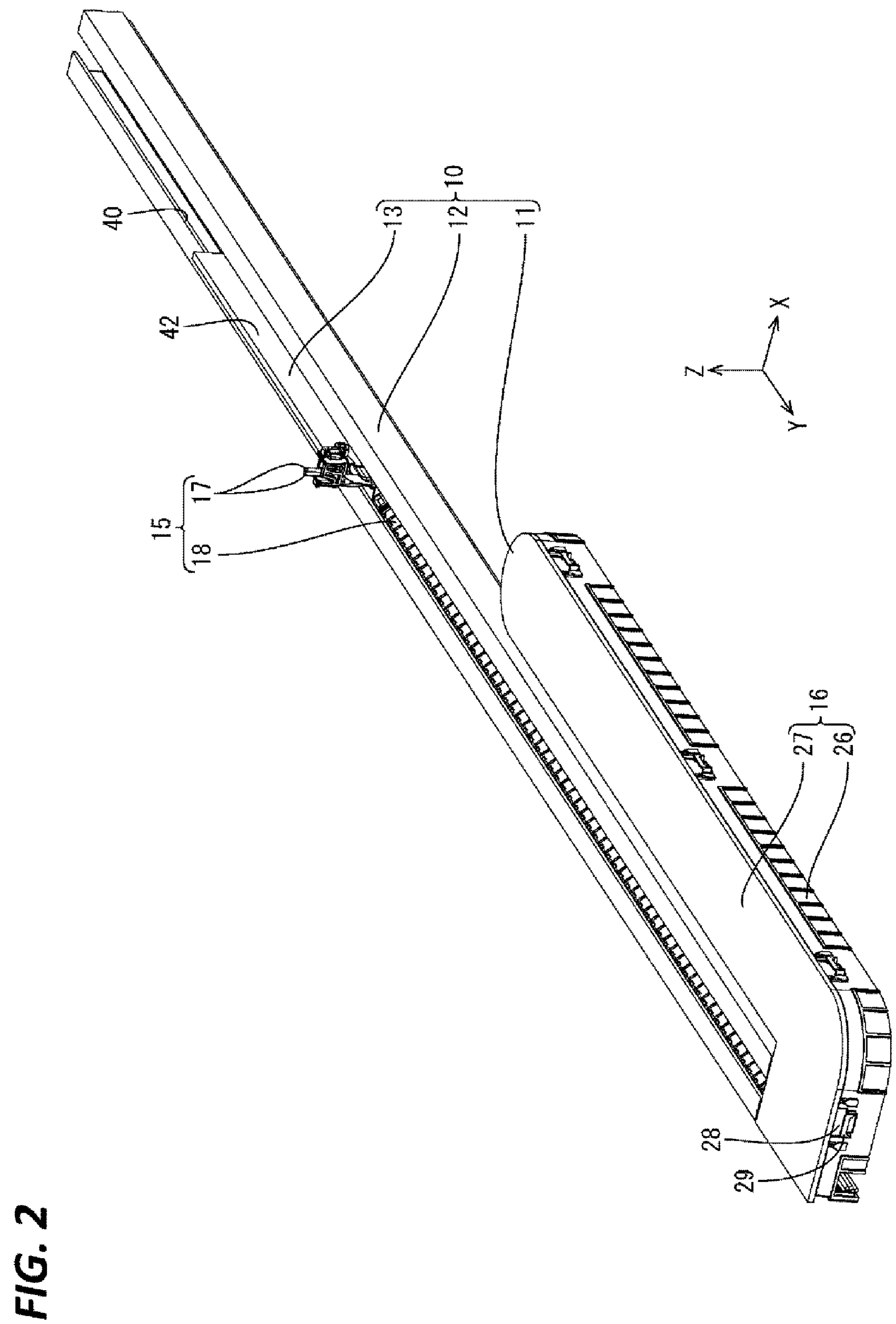
FIG. 2 is a perspective view showing the slide wiring device.

As shown in FIG. 2, the wire harness 15 routed between the seat 14 and the vehicle body is inserted into the rail 12 and a case 16 that are located under the seat 14. The wire harness 15 includes a plurality of (four, in the present embodiment) wires 17 and an exterior member 18 that covers the plurality of wires 17. The wires 17 each have a conductor portion made of a metal and coated with an insulating layer, and are connected to the various electrical and electronic components provided in the seat 14.

The exterior member 18 is made of an insulating synthetic resin, and extends in a belt-like shape while covering the wires 17. In other words, the plurality of wires 17 are enclosed in the exterior member 18. The exterior member 18 is composed of a plurality of tubular units 19 that are connected together using hinges 20 integrally formed with the respective units 19. The exterior member 18 is formed so as to be able to be curved at the hinges 20.

(Wire Harness Routing Device 11)

The wire harness routing device 11 includes the wire harness 15, the case 16 that accommodates the wire harness 15, a protector 21 that is attached to the wire harness 15 that is led out of the case 16, and an engagement means 22 that is configured to disengageably engage the case 16 and the protector 21 with each other.

Figure 3:
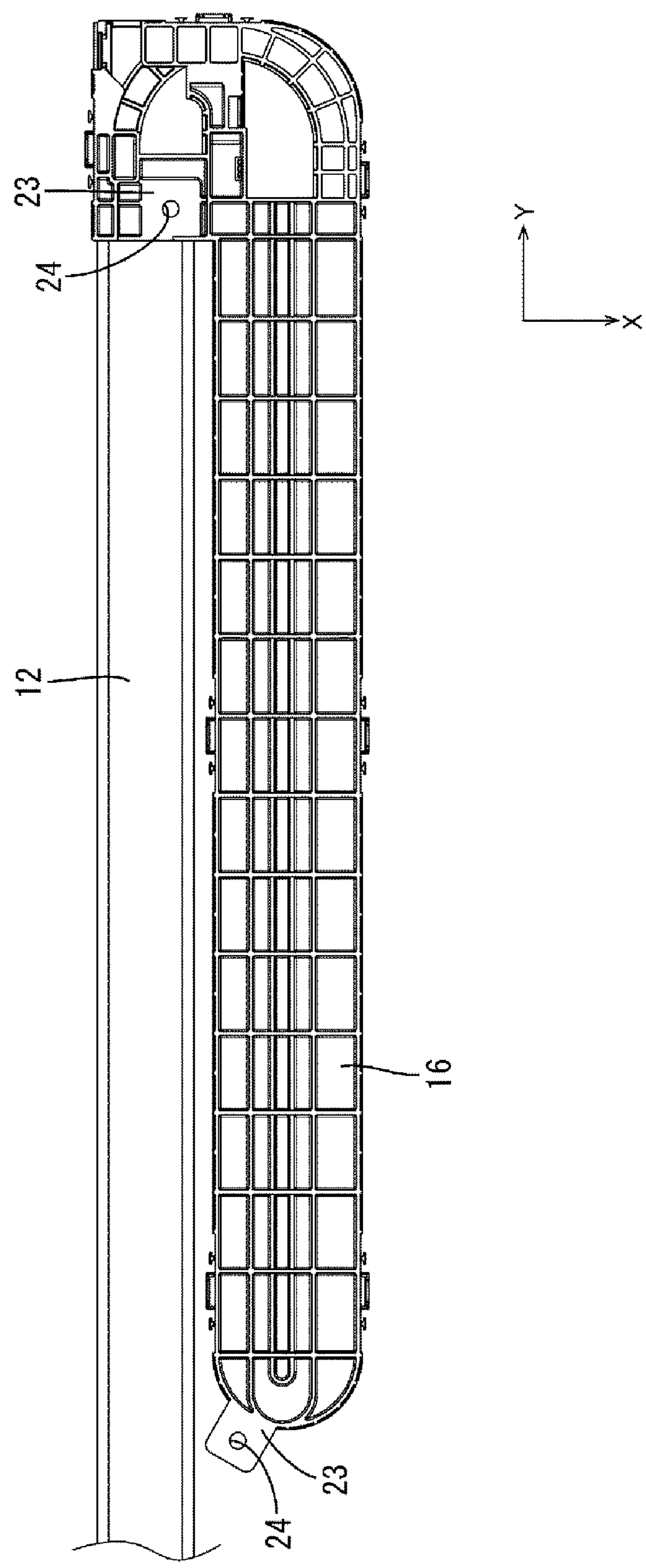
FIG. 3 is a bottom view showing the slide wiring device.

As necessary, an appropriate material such as a synthetic resin or a metal is selected as the material that forms the case 16. As shown in FIG. 3, the case 16 is provided with brackets 23. The case 16 is configured to be fixed to the vehicle body by inserting bolts (not shown) into through holes 24 that penetrate the respective brackets 23 and screwing the bolts to the vehicle body.

As shown in FIG. 2, the case 16 has a form that is elongated in the front-rear direction with a portion thereof slightly protruding leftward from a front end portion thereof, and is substantially J-shaped when viewed from above.

The case 16 includes a lower case 26 that opens upward and an upper case 27 that is attached to the lower case 26 from the upper side and covers the lower case 26. The upper case 27 has substantially the same shape as an opening portion at an upper end edge of the lower case 26. The lower case 26 and the upper case 27 are configured to be attached to each other by locking claws 28 that are formed in a side wall of the upper case 27 being elastically locked to locking pieces 29 that are formed in a side wall of the lower case 26.

Figure 10:
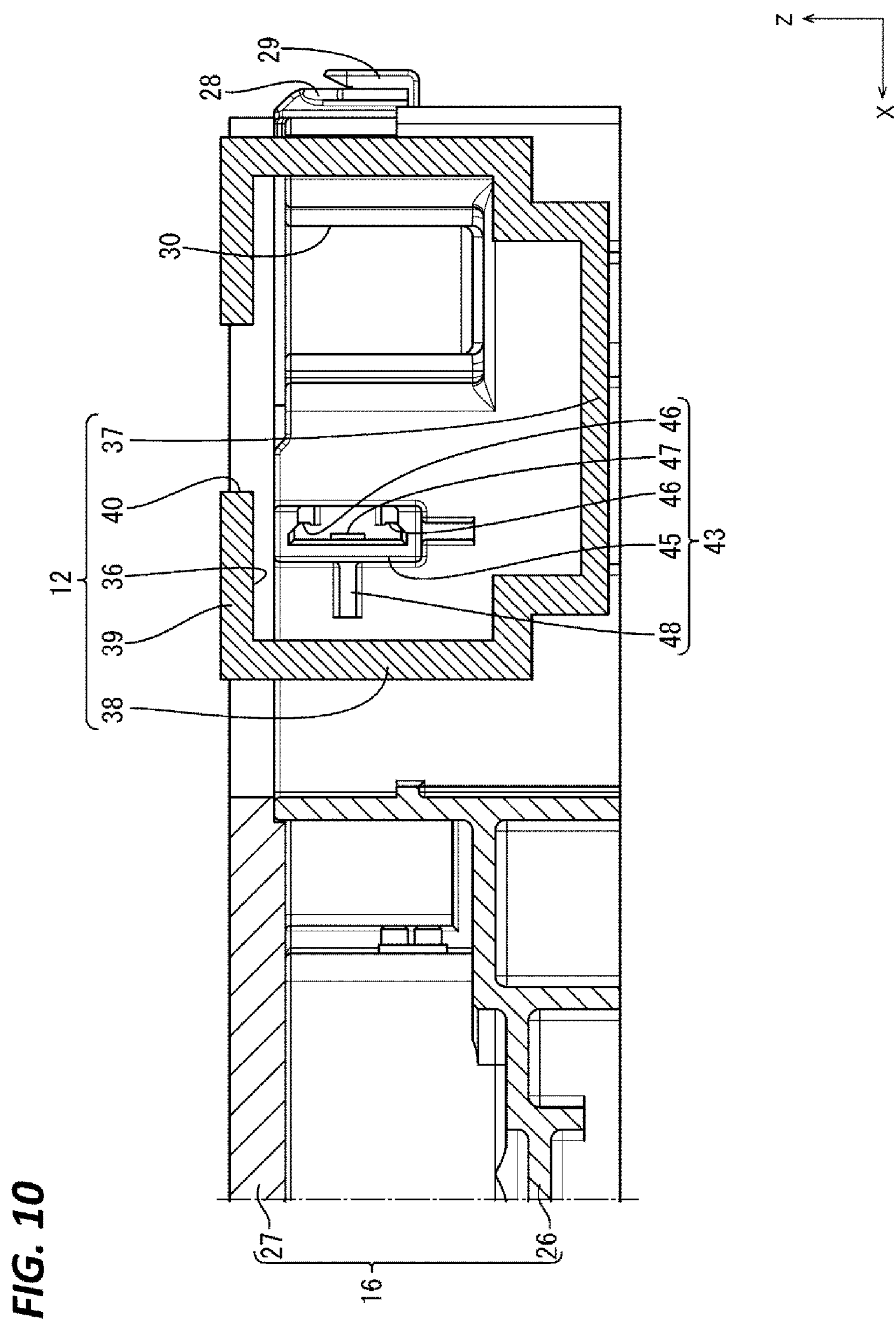
FIG. 10 is a cross-sectional view taken along line X-X in FIG. 8.

As shown in FIG. 10, an opening 30 that opens rearward is formed in a rear end portion of the leftward protruding portion at a front end portion of the lower case 26, the opening 30 being located closer to the left side in the rear end portion. The wire harness 15 is led out of or into the case 16 through this opening 30. The opening 30 is formed to have a cross-sectional shape that is larger than the cross-sectional shape of the exterior member 18, so that the exterior member 18 can be easily inserted into the opening 30.

Figure 5:
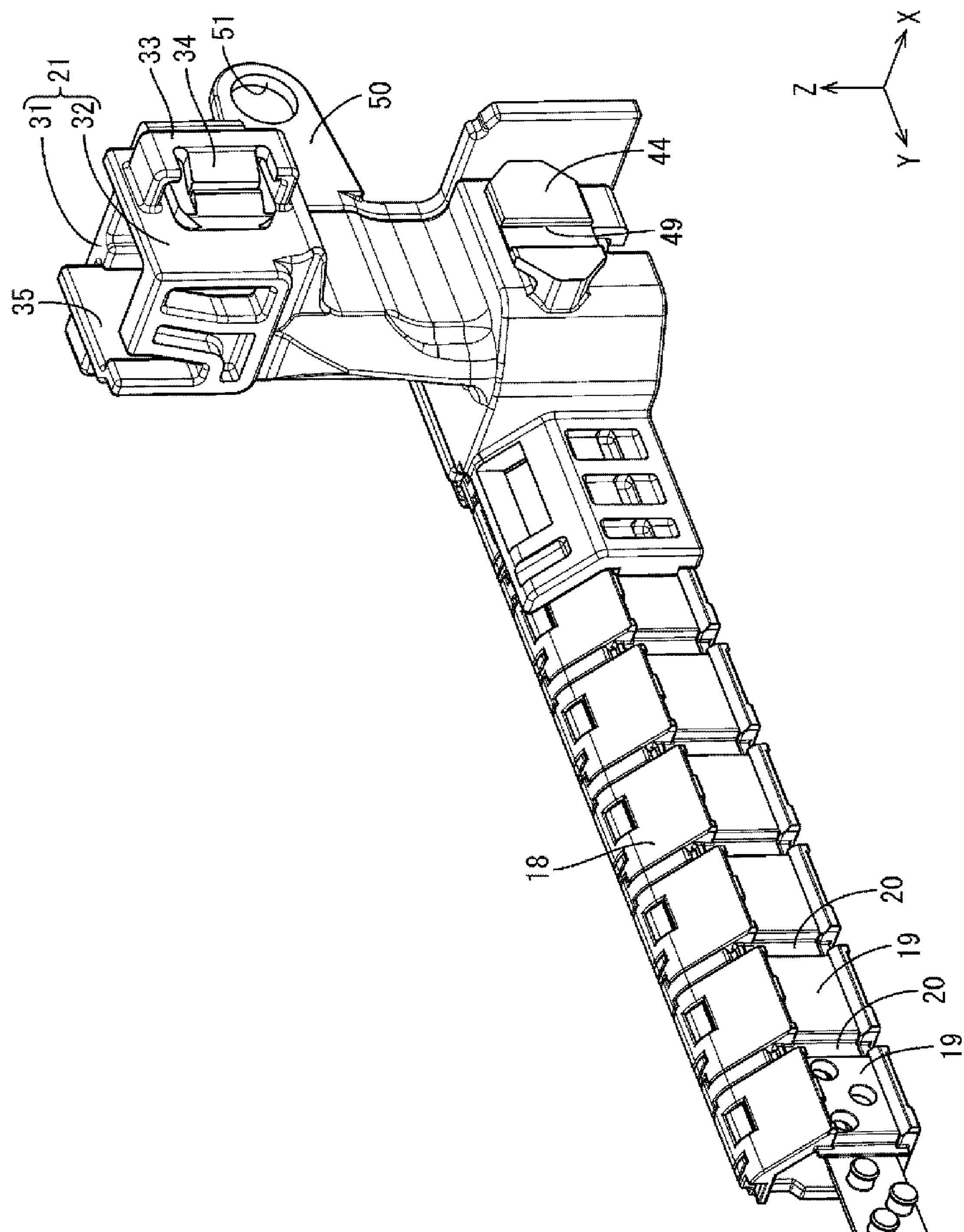
FIG. 5 is a perspective view showing a state in which a protector and an exterior member are assembled.
Figure 6:
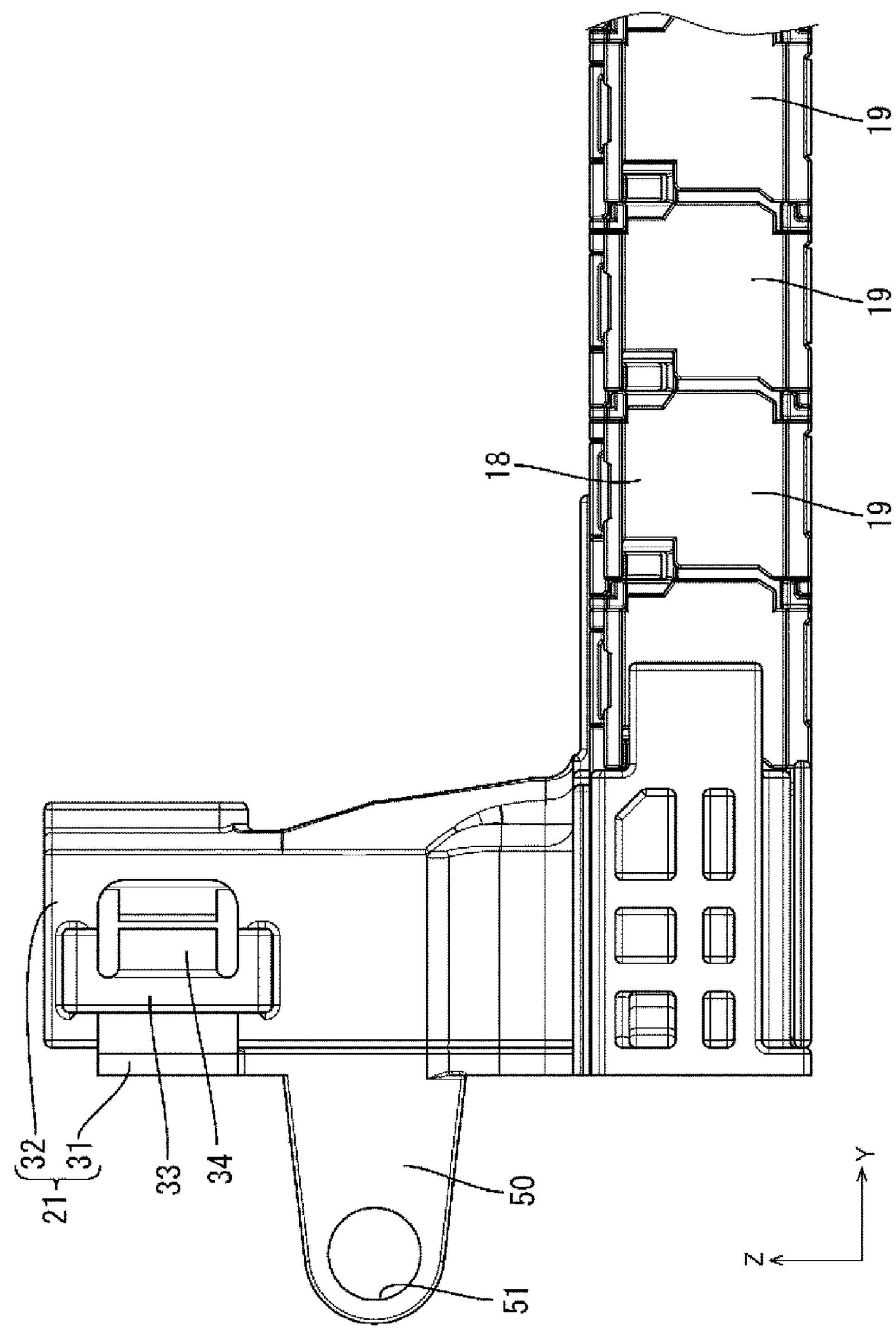
FIG. 6 is a left side view showing the state in which the protector and the exterior member are assembled.
Figure 7:
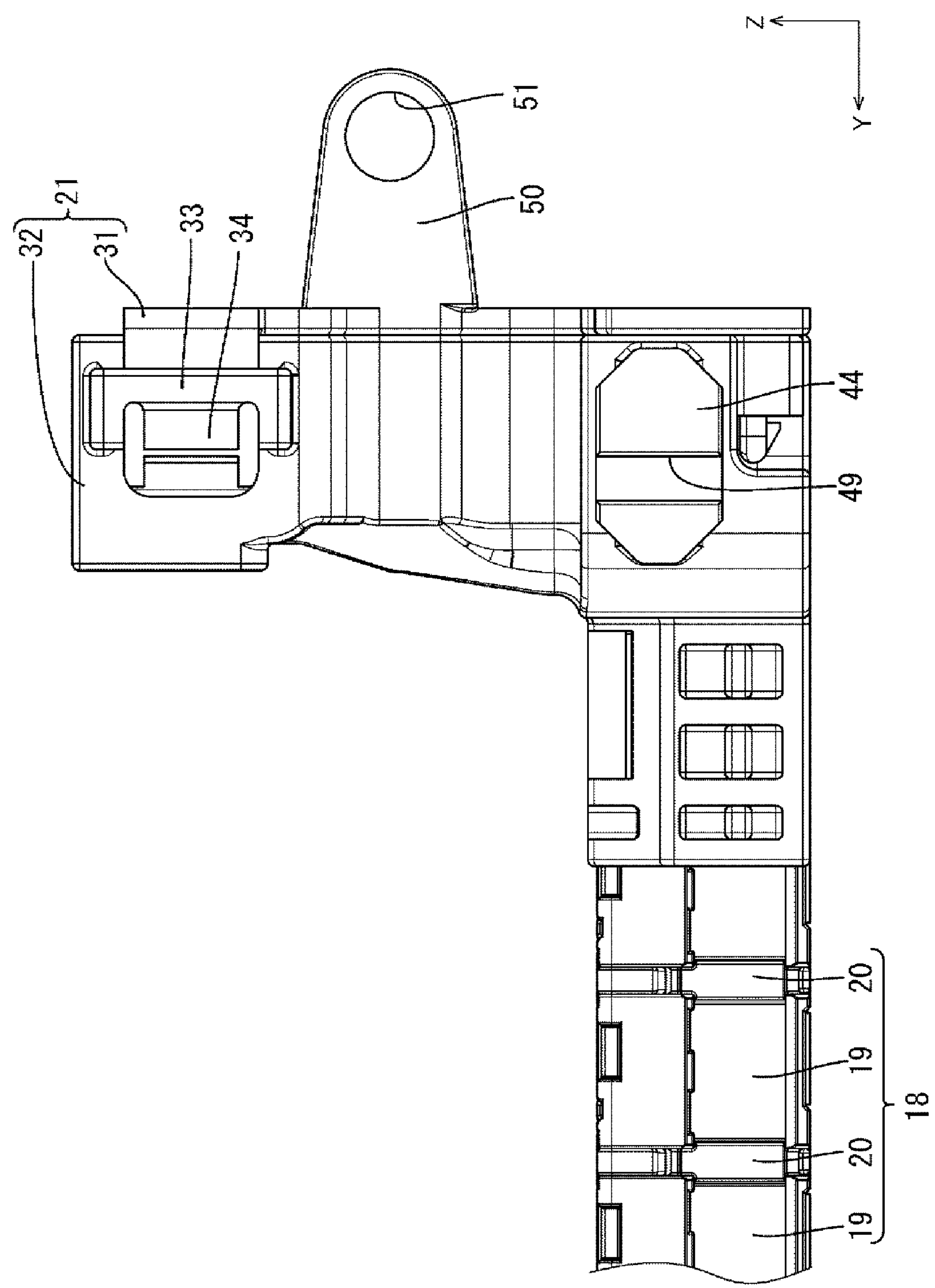
FIG. 7 is a right side view showing the state in which the protector and the exterior member are assembled.
Figure 8:
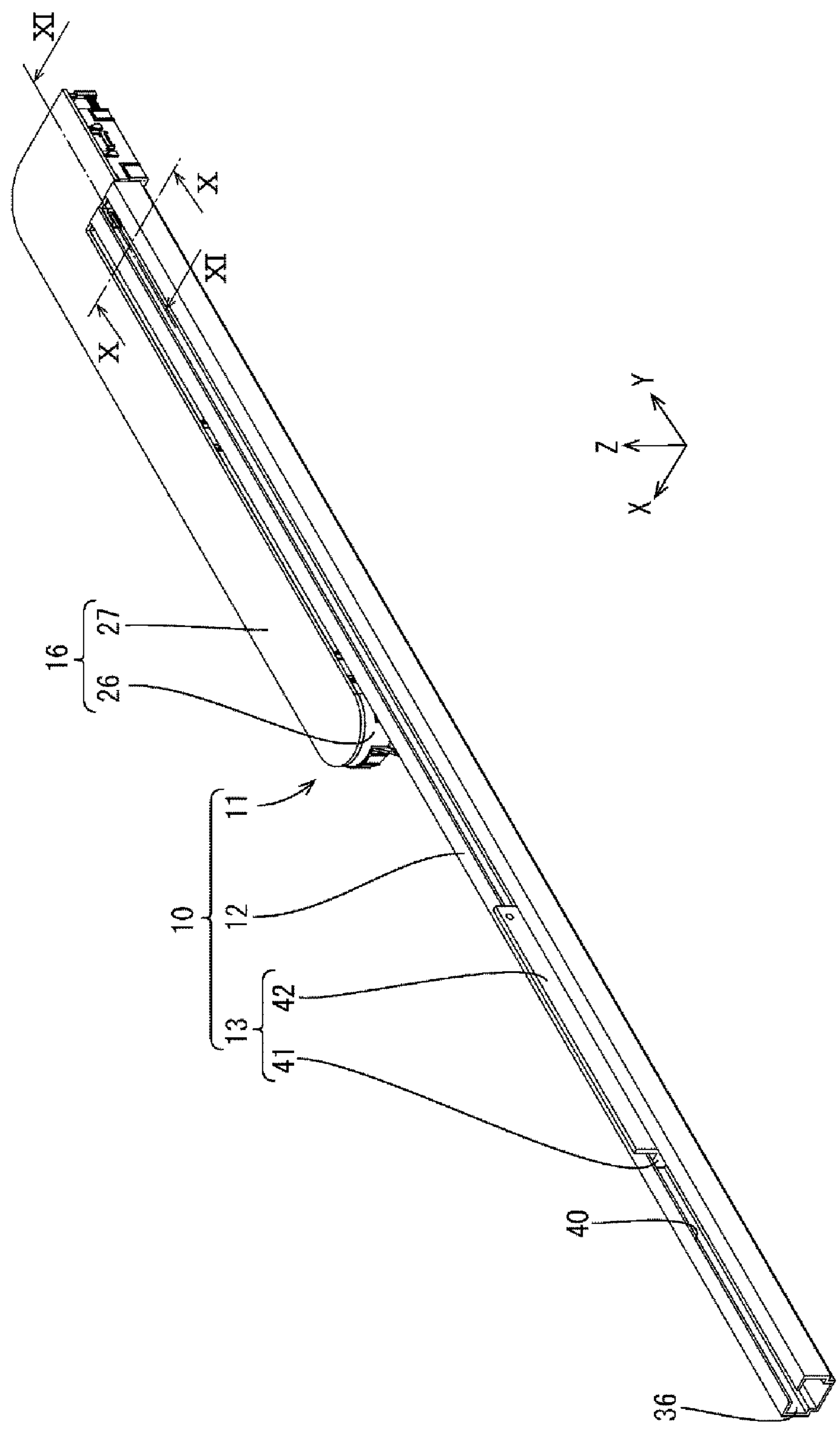
FIG. 8 is a perspective view showing a state in which a case and a rail are assembled at a predetermined position.

As shown in FIGS. 5, 6, and 7, the wires 17 enclosed in the exterior member 18 are led out rearward through the opening 30. The protector 21 made of a synthetic resin is provided at a rear end portion of the exterior member 18. The protector 21 is composed of a first member 31 and a second member 32 that are separable and attached to each other by a lock portion 33 formed in one of these members and a lock receiving portion 34 formed in the other member elastically engaging with each other. An end portion of the exterior member 18 is held between the first member 31 and the second member 32, and the exterior member 18 and the protector 21 are thereby attached to each other.

The protector 21 has a tubular portion 35 that extends and opens upward. The wires 17 led out of the exterior member 18 are led out upward through an upper end portion of this tubular portion 35.

(Rail 12)

The rail 12 is made of a metal. For each seat 14, a pair of rails 12 are provided on the floor. Any appropriate metal such as stainless steel, aluminum, or an aluminum alloy can be used as the metal that forms the rail 12, as necessary. FIG. 1 shows only the rail 12 disposed on the right side, of the pair of rails 12. The rail 12 can be formed using a known method such as extrusion molding, die casting, bending, welding, and the like.

Figure 4:
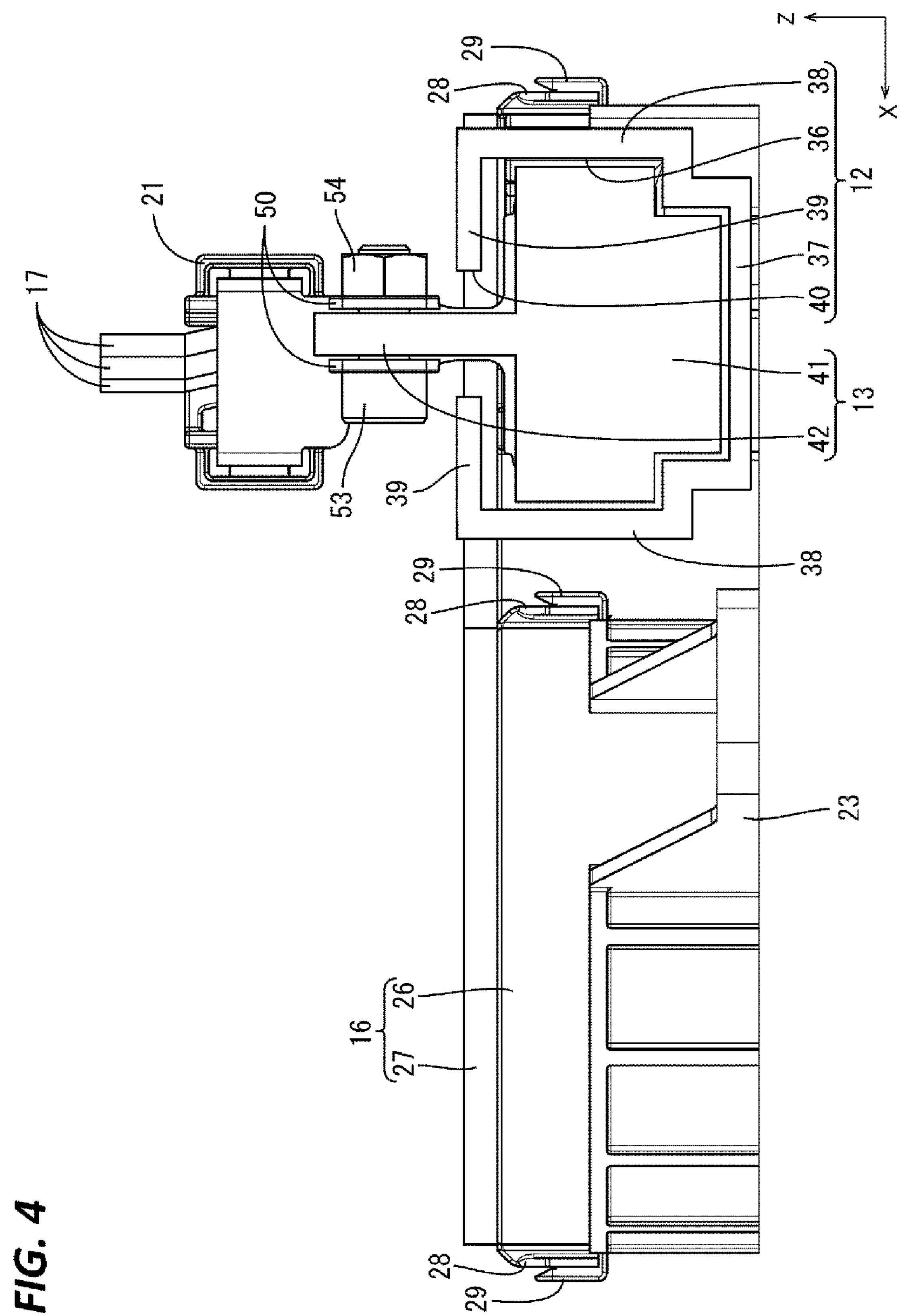
FIG. 4 is a rear view showing the slide wiring device.

The rail 12 extends in a straight line in the front-rear direction, and, as shown in FIG. 4, an insertion hole 36 into which the slider 13 is inserted penetrates the rail 12 in the front-rear direction. The insertion hole 36 has a substantially rectangular shape that conforms with the cross-sectional shape of the slider 13. The slider 13 is disposed in the insertion hole 36 in such a manner as to be able to slide in the front-rear direction.

The rail 12 has a bottom wall 37 that extends in the front-rear direction, a pair of side walls 38 that extend upward from left and right side edges, respectively, of the bottom wall 37, and an upper wall 39 that extends inward in the left-right direction from upper end edges of the side walls 38. In the upper wall 39, a through groove 40 that is in communication with the outside is formed at a position above the insertion hole 36. The side walls 38 form a shape that becomes wider in the left-right direction at a position that is slightly higher than lower end portions thereof. Although not shown in detail, the bottom wall 37 is provided with a fixing means for fixation to the vehicle. An example of the fixing means is, but is not limited to, a bolt.

(Slider 13)

The slider 13 is made of, for example, a synthetic resin or a metal and can slide in the insertion hole 36 of the rail 12. As shown in FIG. 4, the slider 13 has a horizontally-long insertion portion 41 that is fitted into the insertion hole 36 and an attachment portion 42 that has a plate-like shape and protrudes upward from an upper surface of the insertion portion 41.

The attachment portion 42 is formed over the entire length of the slider 13, and fixed to the seat 14 with the use of a known means such as a bolt, for example. The attachment portion 42 slides in a slit that is formed in the mat or the like on the floor. When the attachment portion 42 is fixed to the seat 14, the slider 13 slides in the rail 12 in accordance with the sliding movement of the sliding seat 14.

(Engagement Means 22)

Figure 19:
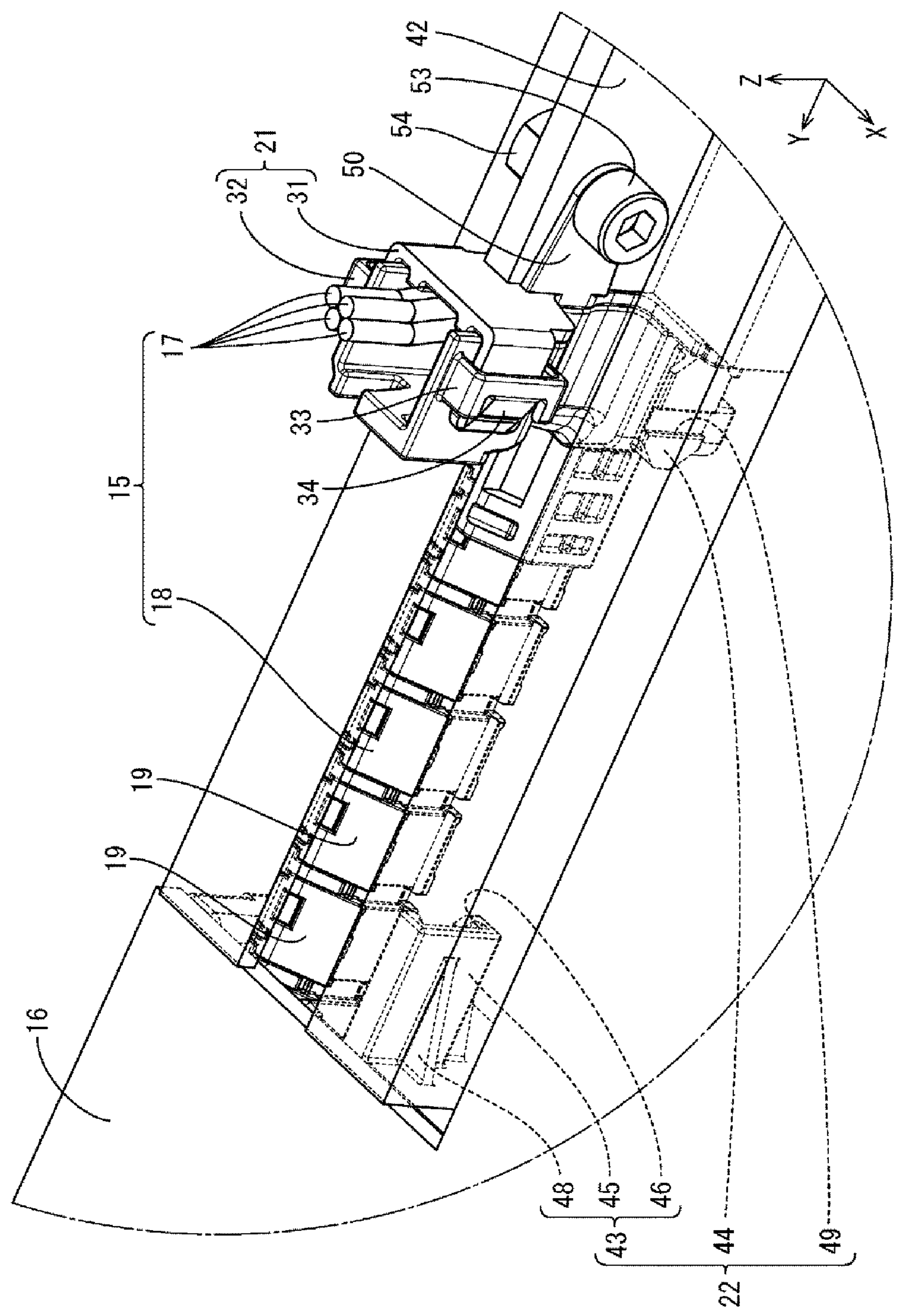
FIG. 19 is a partially enlarged perspective view showing the state in which the engagement between the case and the protector is cancelled in the slide wiring device assembly process.

As shown in FIG. 19, the protector 21 and the case 16 are disengageably engaged with each other using the engagement means 22. The engagement means 22 according to the present embodiment is constituted by an engaging portion 43 that extends rearward from an opening edge portion of the opening 30 of the case 16 and an engaged portion 44 that extends forward from a position at a rear end portion of the protector 21, the position corresponding to the engaging portion 43.

Figure 11:
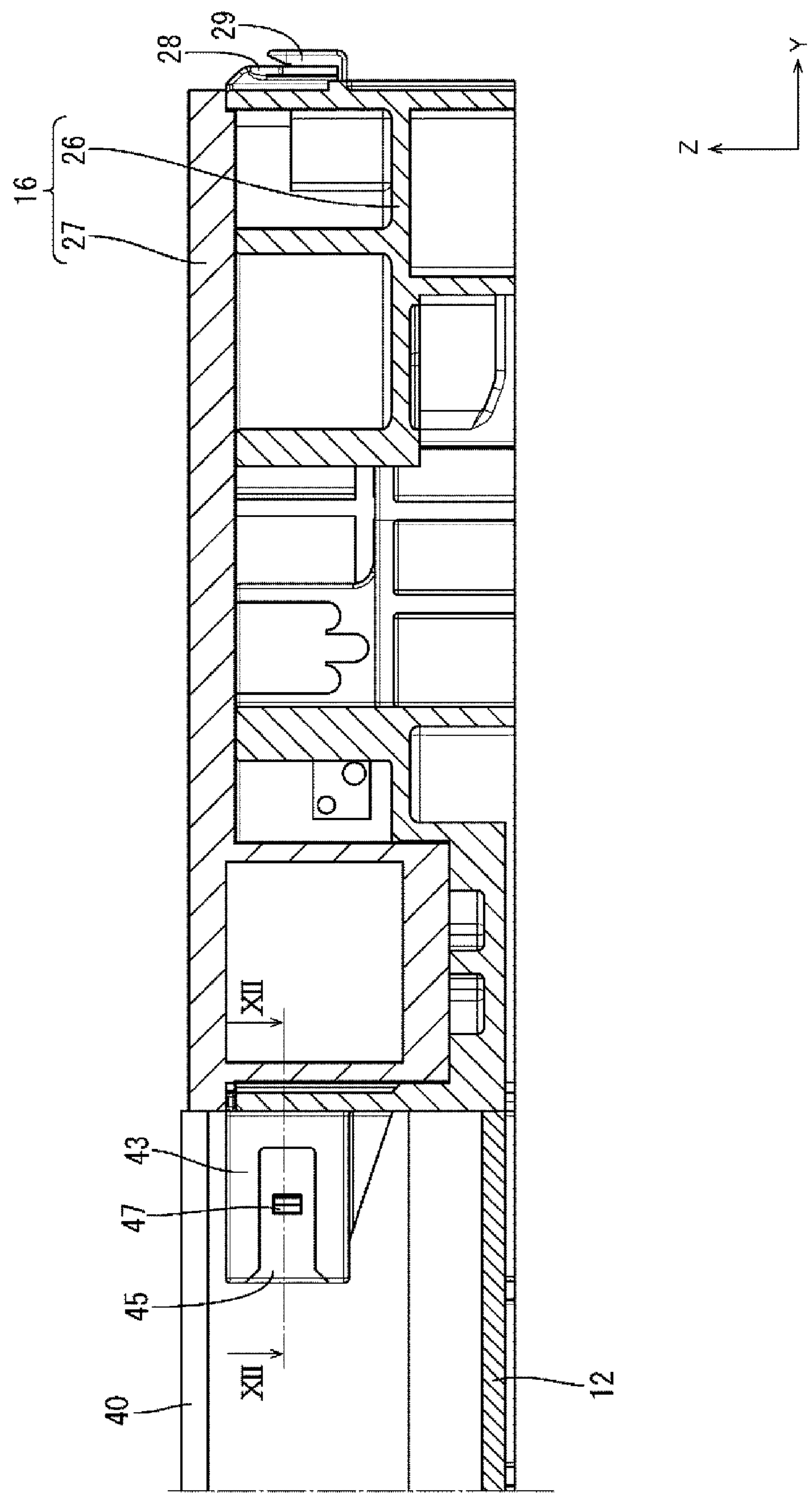
FIG. 11 is a cross-sectional view taken along line XI-XI in FIG. 8.
Figure 12:
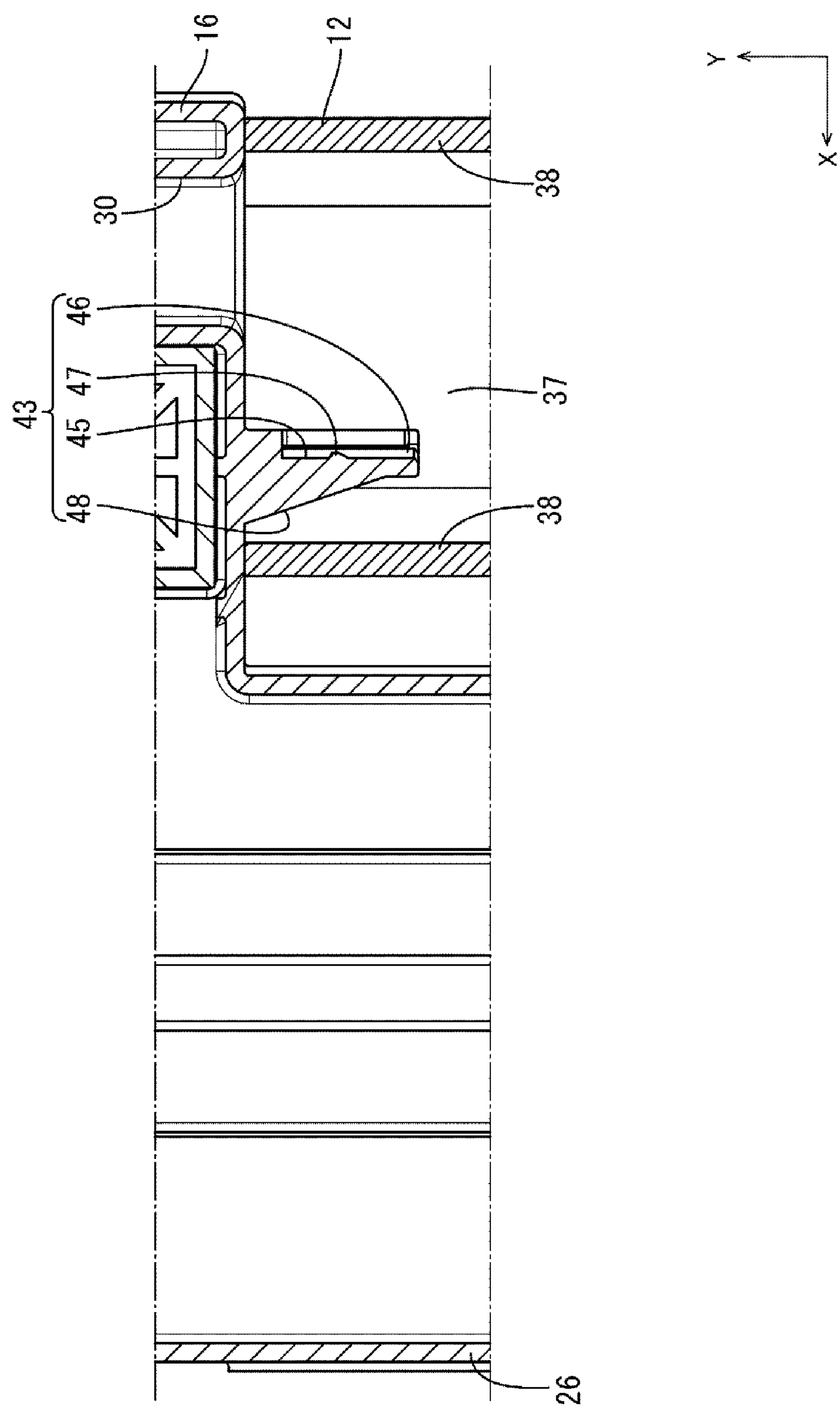
FIG. 12 is a cross-sectional view taken along line XII-XII in FIG. 11.

As shown in FIG. 10, the engaging portion 43 is formed at a right side edge of the opening edge portion of the opening 30 of the case 16. Note that the engaging portion 43 being provided at the opening edge portion of the opening 30 includes not only a case where the engaging portion 43 is formed so as to continuously extend from the opening edge portion of the opening 30 but also a case where the engaging portion 43 is provided in proximity to the opening edge portion of the opening 30 to such an extent that it is considered as being formed substantially at the opening edge portion. As shown in FIG. 11, the engaging portion 43 has a base wall 45 extending in the front-rear direction. A wall surface of the base wall 45 extends in the vertical direction. As shown in FIGS. 10, 11, and 12, on a left side surface of the base wall 45, groove portions 46 are formed which protrude leftward from an upper end edge, a front end edge, and a lower end edge thereof and in which side edges of the engaged portion 44 can be accommodated. An upper end edge, a front end edge, and a lower end edge of the engaged portion 44 of the protector 21 are to be inserted into spaces between the base wall 45 and the groove portions 46. An engagement projection 47 protruding leftward is provided on the left side surface of the base wall 45. A reinforcement rib 48 extending in the front-rear direction and protruding rightward is provided on a right side surface of the base wall 45.

As shown in FIGS. 5 and 7, the engaged portion 44 is formed on a side wall on the right side of the rear end portion of the protector 21 and extends in the front-rear direction. The engaged portion 44 is in the form of a plate that is elastically deformable in the left-right direction. An engagement groove 49 extending in the vertical direction is formed in a right side surface of the engaged portion 44. As a result of the engagement projection 47 of the engaging portion 43 being engaged with the engagement groove 49 from the rear side, rearward movement of the protector 21 relative to the case 16 is restricted. A front end portion of the engaged portion 44 has a tapered shape with respect to the vertical direction. Thus, it is easy for the engaged portion 44 to enter the groove portions 46 formed in the engaging portion 43 of the case 16.

Figure 9:
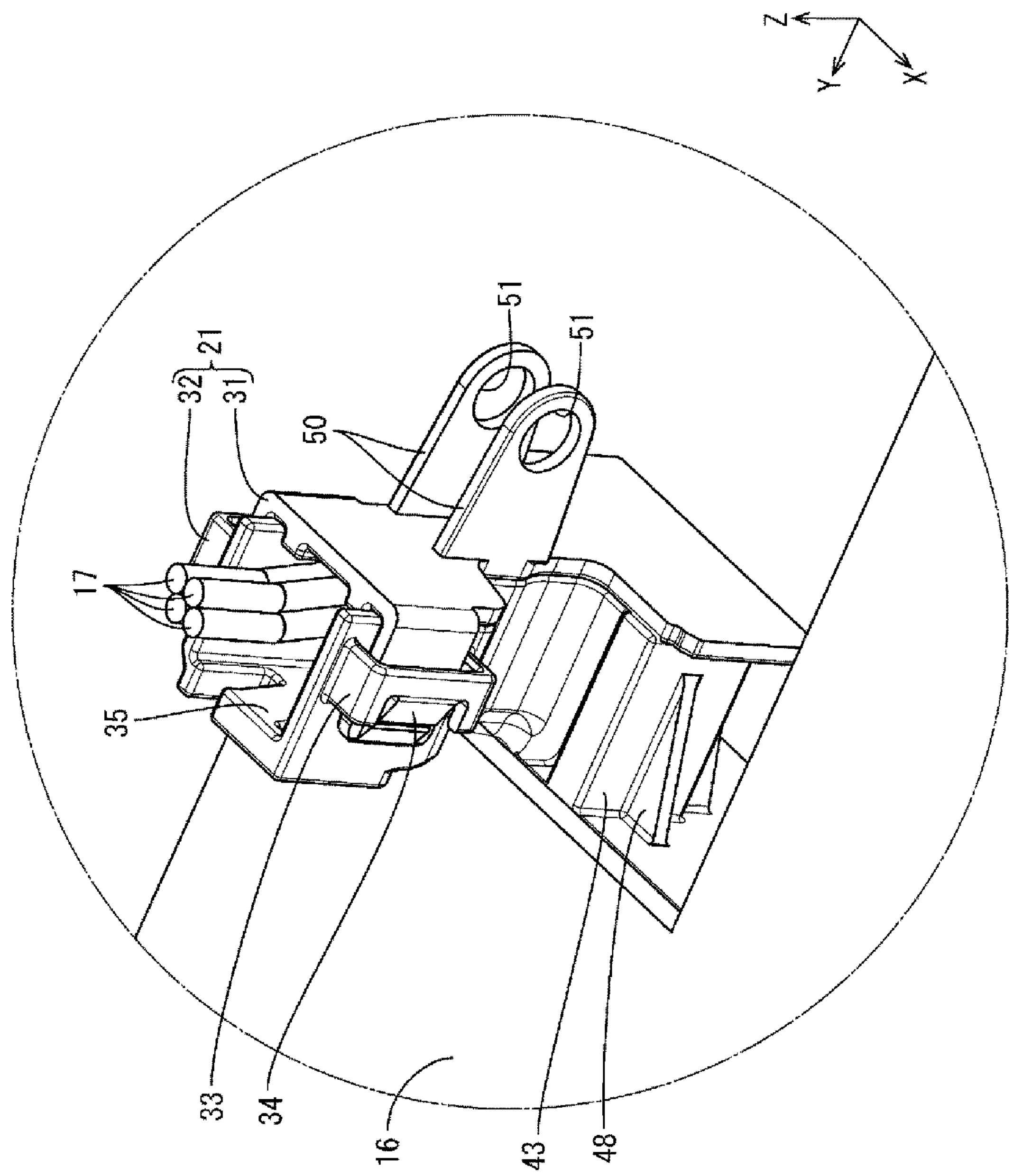
FIG. 9 is a partially enlarged perspective view showing a wire harness routing device.

As shown in FIG. 9, in a state in which the case 16 and the protector 21 are engaged with each other, the tubular portion 35 of the protector 21 is located rearward of a front end portion of the rail 12. In other words, at least the tubular portion 35 of the protector 21 is located in a region where the slider 13 can slide on the rail 12.

(Temporary Locking Portions 50)

A pair of temporary locking portions 50 are formed protruding rearward from a rear end portion of the tubular portion 35 of the protector 21. Each temporary locking portion 50 has a plate-like shape with its plate surfaces extending in the vertical direction. A protector-side through hole 51 penetrating the temporary locking portion 50 in the left-right direction is formed at a position closer to a rear end portion of the temporary locking portion 50. The distance between the pair of temporary locking portions 50 in the left-right direction is set to be equal to or slightly larger than the width of the attachment portion 42 of the slider 13 in the left-right direction. Thus, the attachment portion 42 of the slider 13 can enter between the pair of temporary locking portions 50.

Figure 15:
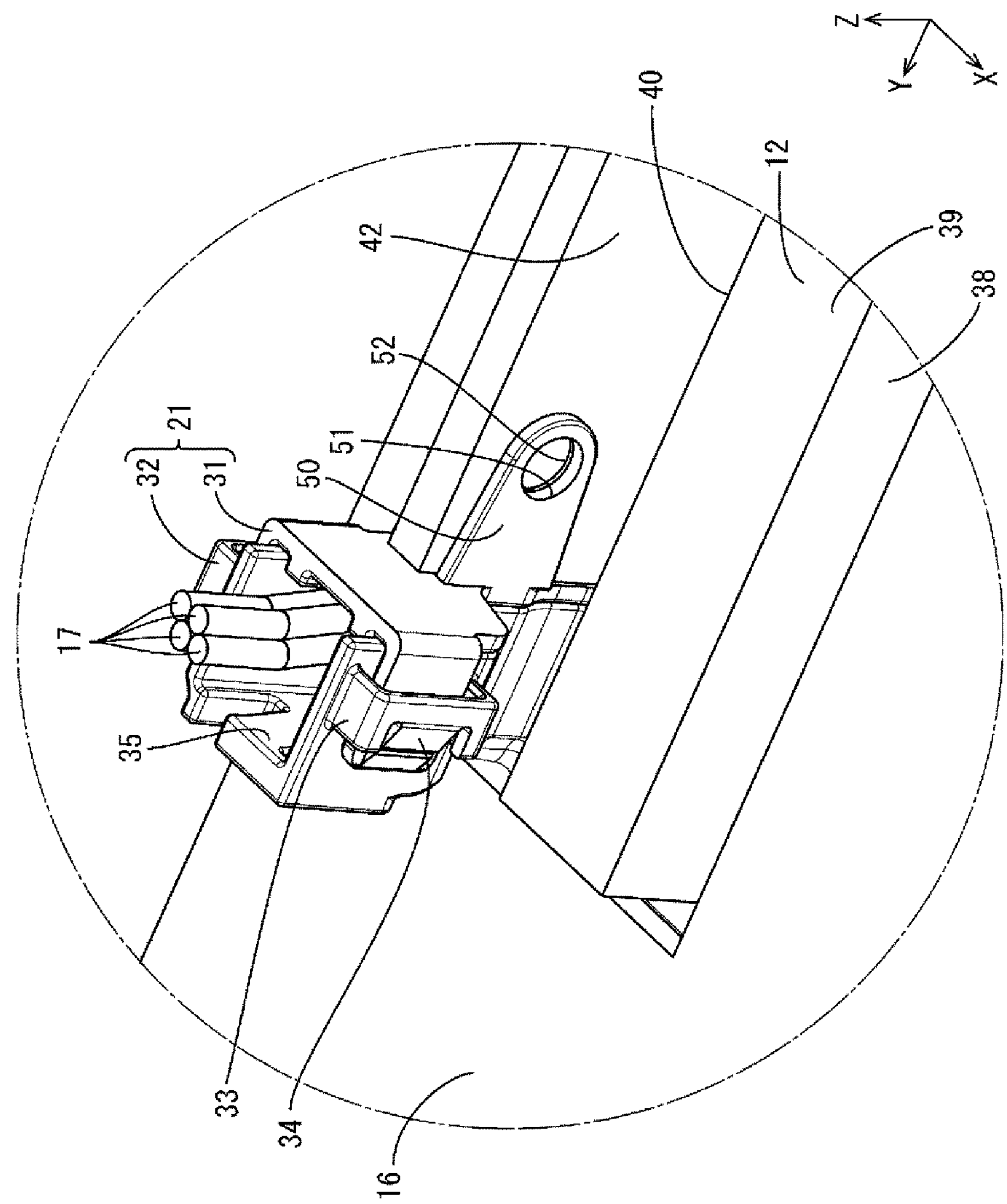
FIG. 15 is a partially enlarged perspective view showing the state in which the slider and the protector are temporarily engaged with each other in the slide wiring device assembly process.
Figure 16:
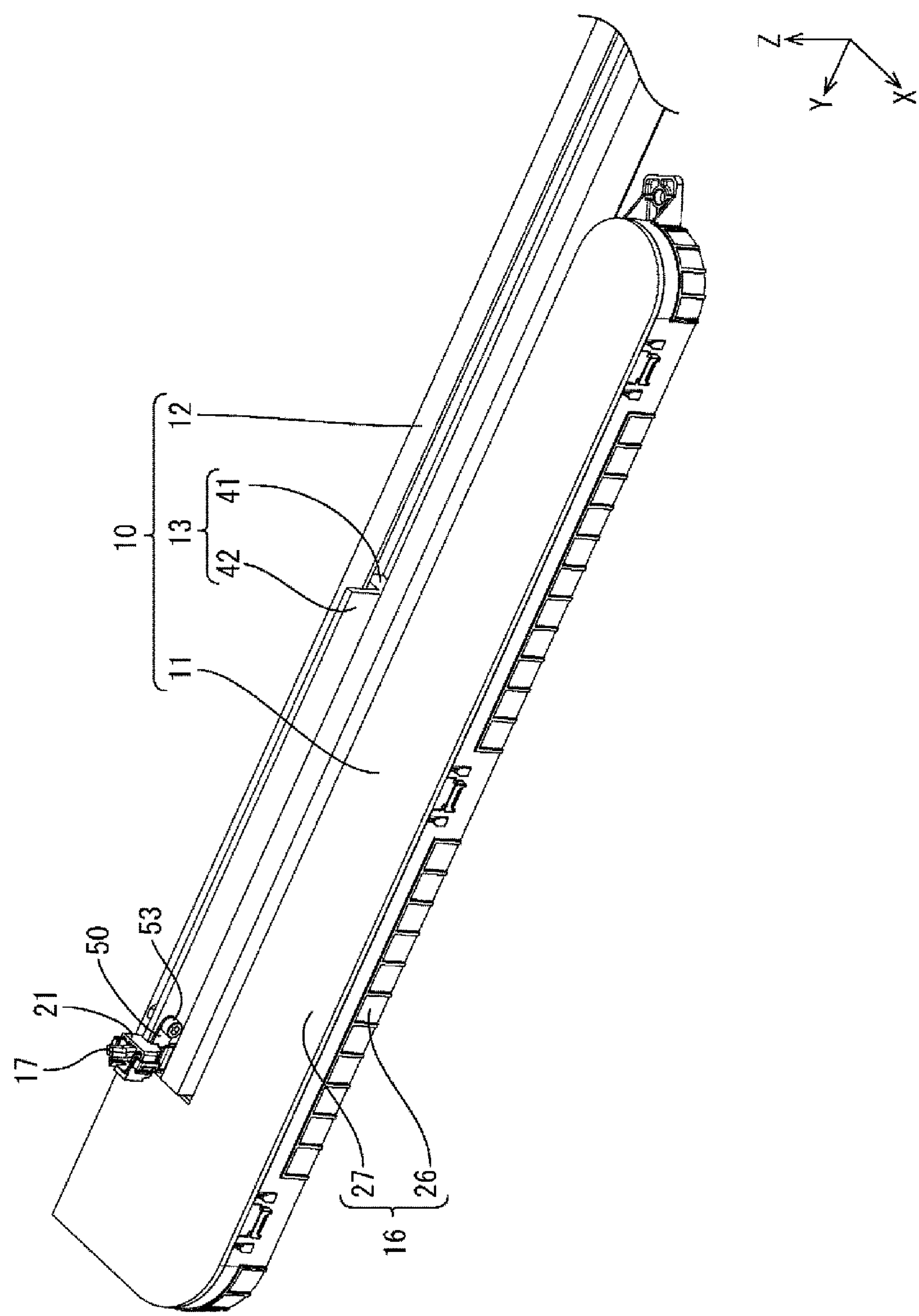
FIG. 16 is a perspective view showing a state in which the slider and the protector are fixed to each other in the slide wiring device assembly process.
Figure 17:
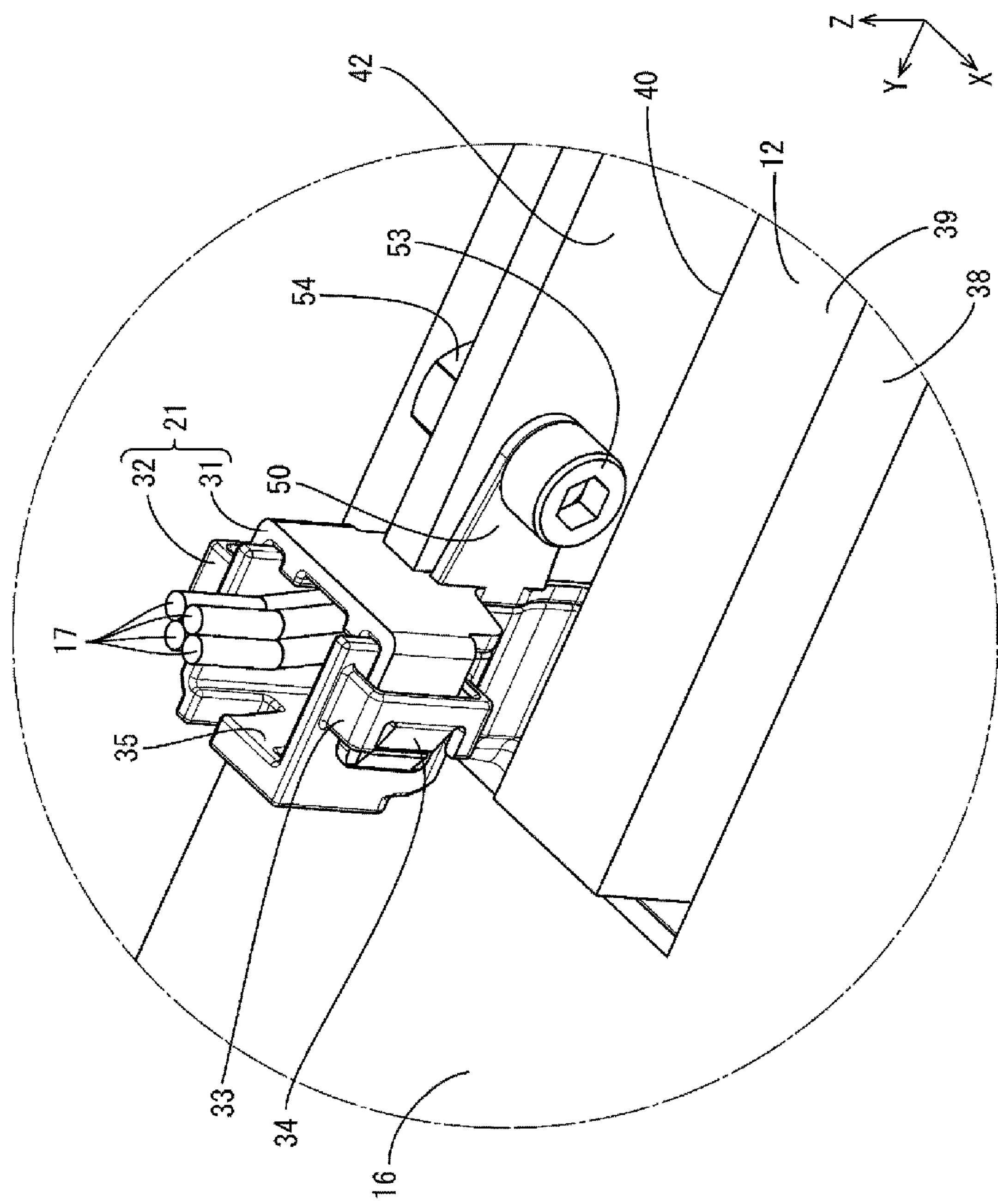
FIG. 17 is a partially enlarged perspective view showing the state in which the slider and the protector are fixed to each other in the slide wiring device assembly process.
Figure 18:
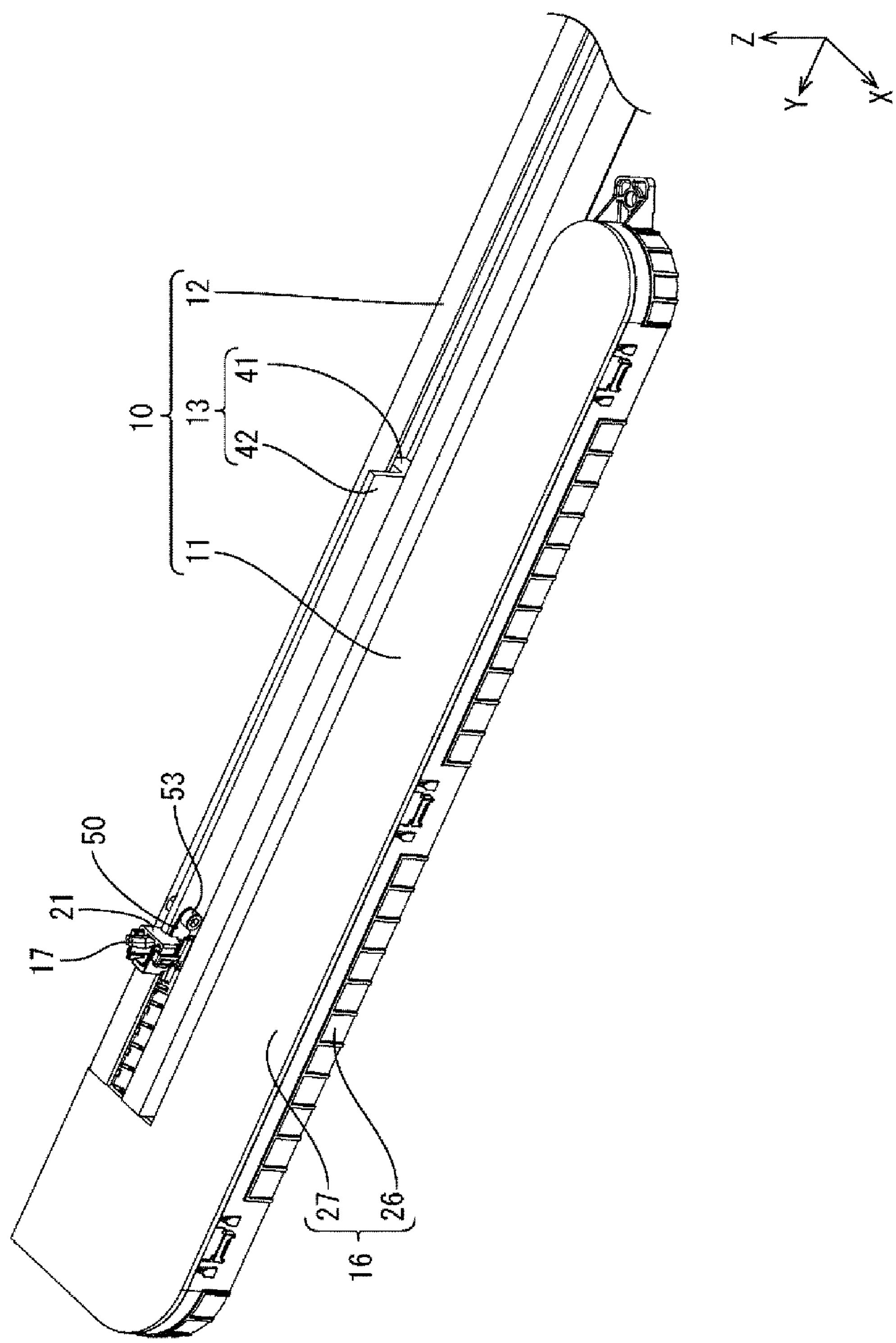
FIG. 18 is a perspective view showing a state in which the engagement between the case and the protector is cancelled in the slide wiring device assembly process.

As shown in FIG. 15, a slider-side through hole 52 that penetrates the attachment portion 42 is formed at a position in the attachment portion 42 of the slider 13, the position corresponding to the protector-side through holes 51 in a state in which the attachment portion 42 of the slider 13 has entered between the pair of temporary locking portions 50. In a state in which the attachment portion 42 has entered between the pair of temporary locking portions 50, a bolt 53 is inserted into the slider-side through hole 52 and the protector-side through holes 51 and then screwed to a nut 54, and thus, the protector 21 and the slider 13 are fixed to each other (see FIG. 17).

(Assembly Process)

Subsequently, an example of an assembly process of the present embodiment will be described. It should be appreciated that the assembly process is not limited to the following description.

The wires 17 are inserted into the inside of the tubular portion 19 of the exterior member 18. One end portion of the exterior member 18 along with the wires 17 that are led out from this end portion is held between the first member 31 and the second member 32, and the protector 21 is thereby mounted to the one end portion of the exterior member 18. Thus, the wire harness 15 is completed.

The wire harness 15 is accommodated in the lower case 26 to which the upper case 27 is not yet attached. Next, the upper case 27 is attached to the lower case 26. At this time, an end portion of the wire harness 15 is led out of the case 16 through the opening 30.

The engaged portion 44 of the protector 21 is moved from the rear side to the front side so as to approach the engaging portion 43 provided in the case 16. Upper and lower side edges of the front end portion of the engaged portion 44 enter the inside of the groove portions 46 formed at the upper and lower side edges of a rear end portion of the engaging portion 43.

When the engaged portion 44 is moved further forward, the front end portion of the engaged portion 44 goes onto the engagement projection 47 of the engaging portion 43. As a result, the engaged portion 44 elastically deforms leftward. When the engaged portion 44 is moved further forward, the engaged portion 44 deforms to return to its original shape, and the engagement projection 47 of the engaging portion 43 fits into the engagement groove 49 of the engaged portion 44. As a result, the engaging portion 43 and the engaged portion 44 are engaged with each other in the front-rear direction, and rearward movement of the protector 21 relative to the case 16 is restricted. Thus, the wire harness routing device 11 is completed (see FIG. 9).

The rail 12 is processed into a predetermined shape, the insertion portion 41 of the slider 13 is inserted into the insertion hole 36 of the rail 12, and the attachment portion 42 of the slider 13 is disposed in the through groove 40 of the rail 12. Thus, the slider 13 is attached to the rail 12 in a state in which the slider 13 can slide in the front-rear direction relative to the rail 12.

Figure 13:
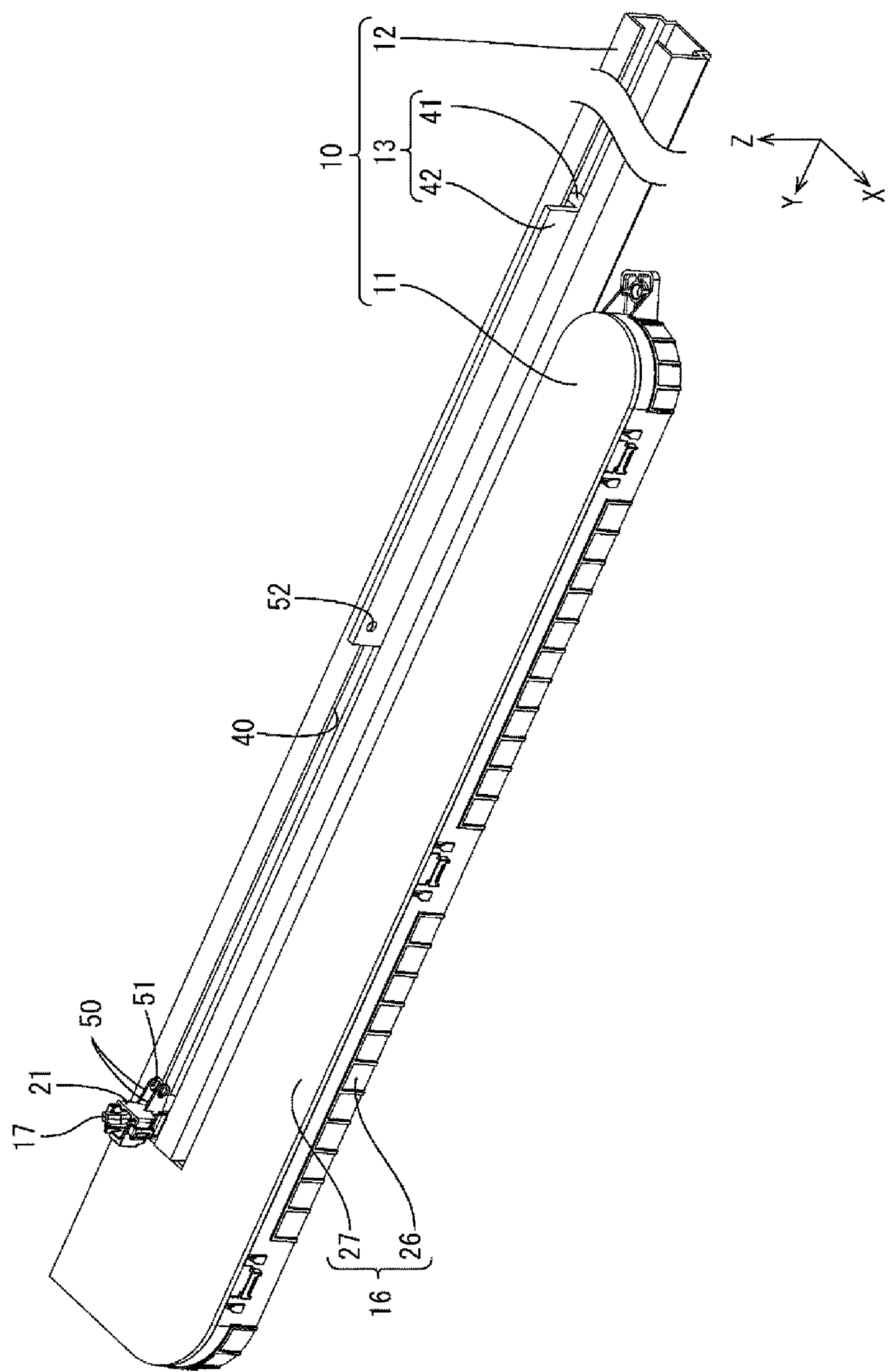
FIG. 13 is a perspective view showing a state before a slider and the protector are temporarily engaged with each other in a slide wiring device assembly process.

As shown in FIG. 13, the wire harness routing device 11 and the rail 12 to which the slider 13 is attached are fixed to a predetermined position in the vehicle. At this time, the wire harness routing device 11 and the rail 12 are arranged such that the opening 30 of the case 16 and the front end portion of the rail 12 oppose each other.

Figure 14:
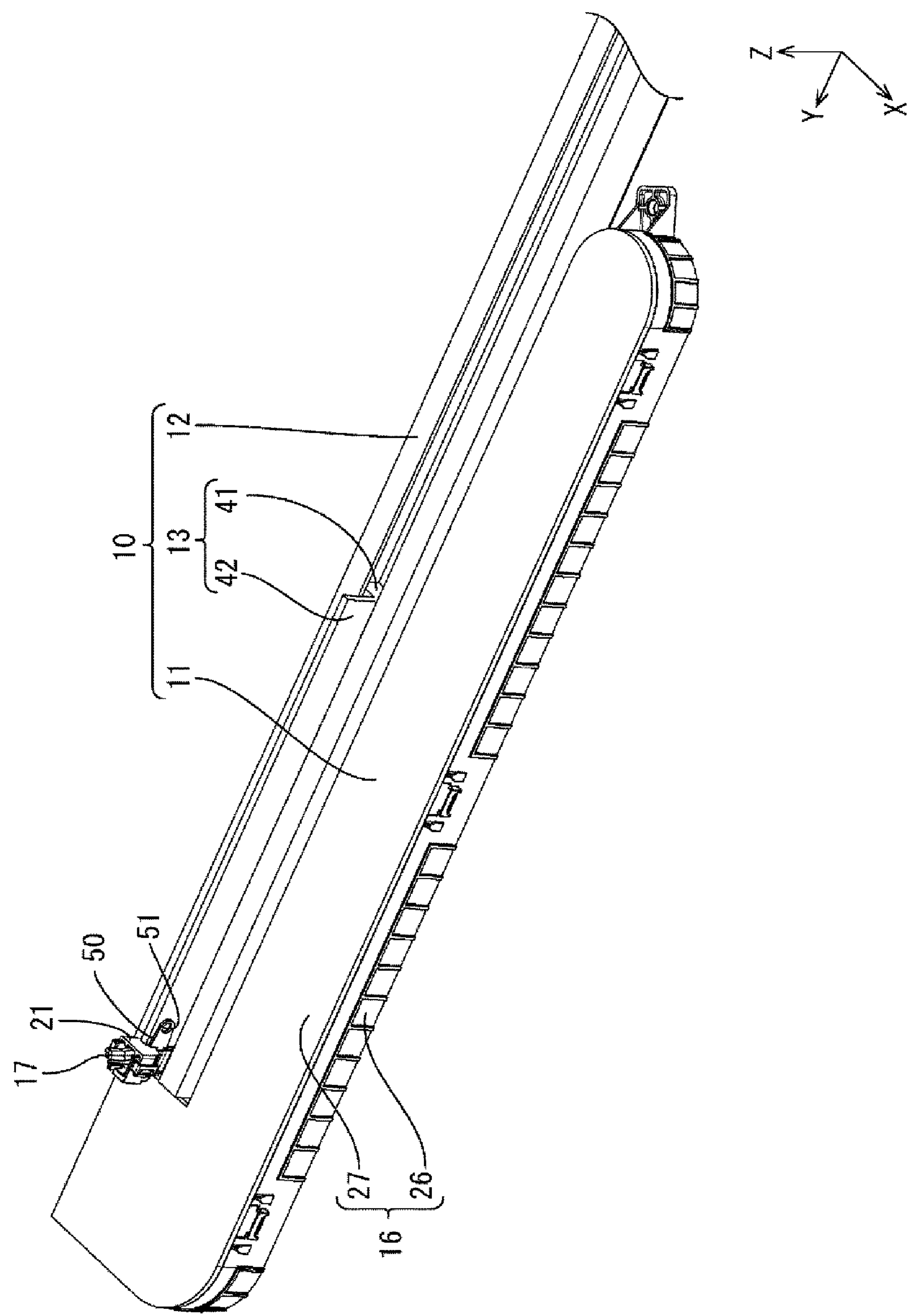
FIG. 14 is a perspective view showing a state in which the slider and the protector are temporarily engaged with each other in the slide wiring device assembly process.

As shown in FIGS. 14 and 15, the slider 13 is moved forward. When the slider 13 is moved to the front end portion of the rail 12, the attachment portion 42 of the slider 13 enters between the pair of temporary locking portions 50 provided in the protector 21. Thus, the slider 13 and the protector 21 are temporarily locked to each other. In this state, the bolt 53 is inserted into the protector-side through holes 51 and the slider-side through hole 52, and a shaft portion of the bolt 53 is screwed to the nut 54. The protector 21 and the slider 13 are thereby fixed to each other (see FIGS. 16 and 17).

Subsequently, the slider 13 is pulled rearward. Thus, the protector 21 fixed to the slider 13 is also pulled rearward. As a result, the engagement projection 47 of the engaging portion 43, which is provided in the case 16, abuts against a front wall of the engagement groove 49, which is provided in the engaged portion 44 of the protector 21, from the rear side. When the slider 13 is pulled further rearward, the engaged portion 44 follows and is also pulled rearward. Thus, the engaged portion 44 goes onto the engagement projection 47, and the engaged portion 44 elastically deforms rightward. When the slider 13 is pulled further rearward, the engaged portion 44 goes over the engagement projection 47 and deforms to return to its original shape, and thus, the engagement between the engaging portion 43 and the engaged portion 44 is cancelled. As a result, the slider 13 can slide in the front-rear direction (see FIG. 18). Since the wire harness 15 is attached to the protector 21 that is fixed to this slider 13, as the slider 13 moves forward or rearward, the wire harness 15 is subjected to a force acting in the front-rear direction and is led out rearward through the opening 30 of the case 16 or into the case 16 through the opening 30. Thus, the slide wiring device 10 is completed.

Effects of the Present Embodiment

Next, effects of the present embodiment will be described. The wire harness routing device 11 according to the present embodiment includes the wire harness 15, the case 16, in which the wire harness 15 is accommodated and which has the opening 30 through which the wire harness 15 can be led out of or into the case 16, the protector 21, which is attached to the wire harness 15 that is led out through the opening 30, and the engagement means 22, which is configured to disengageably engage the case 16 and the protector 21 with each other.

According to the present embodiment, the wire harness 15 that is led out of the case 16 through the opening 30 can be engaged with the case 16. Thus, during transport of the wire harness routing device 11, the wire harness 15 that is led out through the opening 30 of the case 16 is prevented from being shaken even when subjected to vibrations or the like. Thus, the wire harness 15 can be suppressed from colliding with a foreign object.

Moreover, according to the present embodiment, the engagement means 22 is constituted by the engaging portion 43, which is provided in the case 16, and the engaged portion 44, which is provided in the protector 21. Thus, compared with a case where the engagement means 22 is constituted by a member that is different from the case 16 and the protector 21, the number of components can be reduced.

According to the present embodiment, the engaging portion 43 is provided at the opening edge portion of the opening 30.

With this configuration, as the wire harness 15 drawn out of the case 16 is pushed into the case 16 through the opening 30, the protector 21 approaches the opening 30 of the case 16. Since the opening edge portion of this opening 30 is provided with the engaging portion 43 that is to be engaged with the engaged portion 44 of the protector 21, the operation for pushing the wire harness 15 into the case 16 and the operation for moving the protector 21 closer to the engaging portion 43, which is formed at the opening edge portion of the opening 30, can be performed at the same time. Consequently, the protector 21 and the case 16 can be easily positioned relative to each other.

Moreover, according to the present embodiment, the direction in which the engagement between the case 16 and the protector 21 by the engagement means 22 is cancelled is parallel to the direction in which the wire harness 15 is led out through the opening 30. Therefore, the engagement between the case 16 and the protector 21 can be cancelled by pulling the wire harness 15 in the direction in which the wire harness 15 is led out through the opening 30. Consequently, the engagement between the case 16 and the protector 21 can be cancelled using a simple method of pulling the wire harness 15.

The slide wiring device 10 according to the present embodiment includes the wire harness routing device 11, the rail 12, whose one end portion is disposed at the opening 30 of the case 16 and which extends in the direction in which the wire harness 15 is led out through the opening 30, and the slider 13, which is disposed in such a manner as to be able to slide relative to the rail 12 and is also fixed to the protector 21 into a T-shape. In this manner, the wire harness routing device 11 can be applied to the slide wiring device 10.

Moreover, the protector 21 fixed to the slider 13 can also be moved by sliding the slider 13. Thus, the wire harness 15 can be pulled via the protector 21, which is fixed to the slider 13, by moving the slider 13 in the direction in which the wire harness 15 is led out through the opening 30. The engagement between the case 16 and the protector 21 can thus be cancelled. In this manner, the engagement between the case 16 and the protector 21 can be cancelled using a simple method of sliding the slider 13.

Moreover, according to the present embodiment, in a state in which the protector 21 and the case 16 are engaged with each other, at least a portion of the protector 21 is located in a region where the slider 13 can slide, and one of the protector 21 and the slider 13 has the temporary locking portions 50 that are to be temporarily locked to the other.

If the operation for assembling the slider 13 and the protector 21 is performed in a state in which the slider 13 is disposed in the rail 12, the assembling operation may need to be performed in a region within the rail 12. In this case, the operation is performed in a tight space within the rail 12, and therefore, the operation efficiency decreases. To avoid this situation, a method is conceivable in which, after the slider 13 is temporarily removed from the rail 12, the operation for assembling the slider 13 and the protector 21 is performed, and then, the slider 13 is attached to the rail 12 again, but this procedure is troublesome.

According to the present embodiment, the protector 21 and the slider 13 can be temporarily locked to each other by sliding the slider 13 in a state in which the protector 21 is engaged with the case 16. Thus, the protector 21 and the slider 13 can be fixed to each other in a state in which the protector 21 and the slider 13 are temporarily locked to each other, and therefore, the efficiency of the operation for fixing the protector 21 and the slider 13 to each other can be improved.

Other Embodiments

The technology disclosed in the present specification is not limited to the embodiment that has been described above and illustrated in the drawings, and, for example, the following embodiments are also embraced within the technical scope of the technology disclosed in the present specification.

(1) In the foregoing embodiment, the engagement means 22 is constituted by the engaging portion 43 provided in the case 16 and the engaged portion 44 provided in the protector 21. However, the technology disclosed in the present specification is not limited to this configuration. For example, a configuration may also be adopted in which the engagement means 22 is a member that is separate from the case 16 and the protector 21 like a clip, and the case 16 and the protector 21 are engaged with each other by clamping these members together in a state in which they are stacked one on top of the other.

(2) In the foregoing embodiment, a configuration is adopted in which the engaging portion 43 provided in the case 16 is extended in the direction in which the wires 17 are led out of the case 16. However, the technology disclosed in the present specification is not limited to this configuration. A configuration may also be adopted in which the engaged portion 44 provided in the protector 21 is extended in the direction in which the wires 17 are led out of the case 16.

(3) In the foregoing embodiment, the direction in which the engagement between the case 16 and the protector 21 by the engagement means 22 is cancelled is parallel to the direction in which the wires 17 are led out through the opening 30. However, the technology disclosed in the present specification is not limited to this configuration. For example, a configuration may also be adopted in which, as in the case where the engagement means 22 is a clip, the clip is released from the case 16 and the protector 21 in a direction that intersects the direction in which the wires 17 are led out through the opening 30.

(4) The temporary locking portions 50 for temporarily locking the protector 21 and the slider 13 to each other may be omitted.

(5) In the foregoing embodiment, a configuration is adopted in which the seat 14 is attached to the slider 13. However, the technology disclosed in the present specification is not limited to this configuration. A configuration may also be adopted in which any member that slides relative to the rail 12, such as a sliding door, is attached to the slider 13.

(6) In the foregoing embodiment, a configuration is adopted in which the wire harness 15 includes the four wires 17. However, the technology disclosed in the present specification is not limited to this configuration. A configuration may also be adopted in which the wire harness 15 includes two or three, or five or more, wires 17.

LIST OF REFERENCE NUMERALS

10: Slide wiring device
11: Wire harness routing device
12: Rail
13: Slider
15: Wire harness
16: Case
18: Exterior member
21: Protector
22: Engagement means
30: Opening
43: Engaging portion
44: Engaged portion
50: Temporary locking portion
51: Protector-side through hole
52: Slider-side through hole

The invention claimed is:

1. A wire harness routing device comprising:
a wire harness;
a case in which the wire harness is accommodated and which has an opening through which the wire harness is led out of or into the case;
a protector attached to the wire harness that is led out of or into the case through the opening; and
an engagement connector configured to disengageably engage the case and the protector with each other,
wherein the protector is configured to move toward the opening of the case together with the wire harness such that the wire harness is accommodated in the case.

2. The wire harness routing device according to claim 1, wherein the engagement connector is constituted by an engaging portion provided in the case and an engaged portion provided in the protector.

3. The wire harness routing device according to claim 2, wherein the engaging portion is provided at an opening edge portion of the opening.

4. The wire harness routing device according to claim 1, wherein a direction in which engagement between the case and the protector by the engagement connector is cancelled is parallel to a direction in which the wire harness is led out through the opening.

5. A slide wiring device comprising
a wire harness;
a case in which the wire harness is accommodated and which has an opening through which the wire harness is led out of or into the case;
a protector attached to the wire harness that is led out of or into the case through the opening;
an engagement connector configured to disengageably engage the case and the protector with each other;
a rail that extends in a direction in which the wire harness is led out through the opening, one end portion of the rail being disposed at the opening of the case; and
a slider that is disposed in such a manner to be able to slide relative to the rail and that is fixed to the protector,
wherein the protector is configured to move toward the opening of the case together with the wire harness such that the wire harness is accommodated in the case.

6. The slide wiring device according to claim 5,
wherein, in a state in which the protector and the case are engaged with each other, at least a portion of the protector is located in a region where the slider can slide, and
one of the protector and the slider has a temporary locking portion that is to be temporarily locked to the other.

7. The wire harness routing device according to claim 1, wherein the wire harness includes a plurality of wires and a cover configured to cover the plurality of wires.

8. The wire harness routing device according to claim 7, wherein the cover of the wire harness includes a plurality of tubular cases, and a hinge capable of being curved and configured to connect the plurality of tubular cases together.

9. The slide wiring device according to claim 5, wherein the wire harness includes a plurality of wires and a cover configured to cover the plurality of wires.

10. The slide wiring device according to claim 9, wherein the cover of the wire harness includes a plurality of tubular cases, and a hinge capable of being curved and configured to connect the plurality of tubular cases together.

* * * * *